US012128266B2

(12) United States Patent
Bouchard

(10) Patent No.: US 12,128,266 B2
(45) Date of Patent: *Oct. 29, 2024

(54) KITCHEN FIRE SUPPRESSION AIMING SYSTEMS AND METHODS

(71) Applicant: KIDDE-FENWAL, LLC, Ashland, MA (US)

(72) Inventor: Karen K. Bouchard, Palm Beach Gardens, FL (US)

(73) Assignee: KIDDE-FENWAL, LLC, Ashland, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,177

(22) Filed: Sep. 5, 2023

(65) Prior Publication Data

US 2023/0414980 A1 Dec. 28, 2023

Related U.S. Application Data

(63) Continuation of application No. 17/253,533, filed as application No. PCT/US2019/065181 on Dec. 9, 2019, now Pat. No. 11,786,768.

(60) Provisional application No. 62/778,413, filed on Dec. 12, 2018.

(51) Int. Cl.

| | |
|---|---|
| ***A62C 3/00*** | (2006.01) |
| ***A62C 31/03*** | (2006.01) |
| ***A62C 31/28*** | (2006.01) |
| ***A62C 37/40*** | (2006.01) |

(52) U.S. Cl.

CPC .............. *A62C 3/006* (2013.01); *A62C 31/03* (2013.01); *A62C 37/40* (2013.01); *A62C 31/28* (2013.01)

(58) Field of Classification Search

CPC .......... A62C 3/006; A62C 31/03; A62C 37/40

See application file for complete search history.

(56) References Cited

U.S. PATENT DOCUMENTS

| | | | | | |
|---|---|---|---|---|---|
| 3,490,206 | A * | 1/1970 | De Witt | F24C 15/20 | 55/467 |
| 3,588,893 | A * | 6/1971 | McCloskey | A62C 99/009 | 340/630 |
| 3,820,714 | A * | 6/1974 | Erickson et al. | B05B 3/08 | 239/10 |
| 3,889,754 | A * | 6/1975 | Dunn | A62C 3/006 | 169/59 |
| 3,897,828 | A * | 8/1975 | Glover | A62C 37/12 | 169/65 |
| 4,121,767 | A * | 10/1978 | Jensen | G05D 21/02 | 239/71 |
| 4,256,181 | A * | 3/1981 | Searcy | A62C 37/12 | 169/65 |
| 4,821,805 | A * | 4/1989 | Saito | A62C 37/00 | 169/61 |
| 4,979,572 | A * | 12/1990 | Mikulec | A62C 3/006 | 239/524 |
| 5,127,479 | A * | 7/1992 | Stehling | A62C 3/006 | 285/31 |
| 5,351,760 | A * | 10/1994 | Tabor, Jr. | A62C 3/006 | 169/59 |

(Continued)

*Primary Examiner* — Joseph A Greenlund

(74) *Attorney, Agent, or Firm* — Honigman LLP

(57) ABSTRACT

A method of suppressing a kitchen fire includes detecting a fire and identifying a location of the fire with a tracking system, aiming a nozzle at the location, and releasing an agent through the nozzle at the location.

20 Claims, 5 Drawing Sheets

(56) References Cited

U.S. PATENT DOCUMENTS

| | | | | | |
|---|---|---|---|---|---|
| 5,727,634 | A * | 3/1998 | Ishida | A62C 31/05 | 169/61 |
| 5,899,278 | A * | 5/1999 | Mikulec | A62C 3/006 | 169/65 |
| 6,029,751 | A * | 2/2000 | Ford | A62C 3/006 | 169/65 |
| 6,341,655 | B1 * | 1/2002 | Busian | A62C 2/04 | 169/59 |
| 6,523,210 | B1 * | 2/2003 | Andros | B08B 1/32 | 15/1.51 |
| 6,834,728 | B2 * | 12/2004 | Demole | A62C 3/0221 | 269/302 |
| RE39,081 | E * | 5/2006 | Thomas | A62C 37/38 | 250/342 |
| 7,389,824 | B2 * | 6/2008 | Jackson | A62C 35/58 | 239/69 |
| 7,681,655 | B2 * | 3/2010 | Biehl | A47J 27/09 | 169/65 |
| 9,345,914 | B1 * | 5/2016 | Ali | A62C 35/15 | |
| 9,964,495 | B1 * | 5/2018 | Marshall | B05B 12/082 | |
| 10,850,146 | B2 * | 12/2020 | Lee | B05B 3/1035 | |
| 11,191,986 | B2 * | 12/2021 | Hart | A62C 37/40 | |
| 11,786,768 | B2 * | 10/2023 | Bouchard | A62C 37/40 | 169/65 |
| 2001/0032546 | A1 * | 10/2001 | Sharpe | A47J 45/068 | 99/422 |
| 2003/0094287 | A1 * | 5/2003 | Demole | A62C 3/0292 | 169/30 |
| 2004/0016348 | A1 * | 1/2004 | Sharpe | A47J 36/321 | 99/422 |
| 2004/0129434 | A1 * | 7/2004 | Tan | A62C 37/40 | 239/69 |
| 2004/0199302 | A1 * | 10/2004 | Pillar | B65F 3/045 | 701/1 |
| 2005/0126797 | A1 * | 6/2005 | Mikulec | A62C 37/38 | 169/65 |
| 2005/0242086 | A1 * | 11/2005 | Imura | A47J 36/321 | 219/627 |
| 2006/0272832 | A1 * | 12/2006 | Biehl | A62C 31/02 | 169/65 |
| 2007/0169948 | A1 * | 7/2007 | Vidojevic | A62C 3/006 | 169/56 |
| 2007/0246234 | A1 * | 10/2007 | Vegso | A62C 37/12 | 169/59 |
| 2008/0314602 | A1 * | 12/2008 | Lohnes | A62C 13/78 | 169/56 |
| 2011/0000686 | A1 * | 1/2011 | Munro | A62C 3/006 | 169/54 |
| 2011/0268153 | A1 * | 11/2011 | He | A47J 45/068 | 374/E7.004 |
| 2012/0018179 | A1 * | 1/2012 | Munro | A62C 37/40 | 169/65 |
| 2013/0092404 | A1 * | 4/2013 | Mikulec | A62C 3/006 | 169/65 |
| 2013/0161343 | A1 * | 6/2013 | Ferron | A47J 45/068 | 220/756 |
| 2013/0186655 | A1 * | 7/2013 | Mauney | A62C 13/006 | 169/74 |
| 2014/0076588 | A1 * | 3/2014 | Procious | A62C 35/13 | 169/52 |
| 2015/0021054 | A1 * | 1/2015 | McNamara | A62C 35/023 | 169/61 |
| 2016/0030782 | A1 * | 2/2016 | Livchak | B05B 7/265 | 169/46 |
| 2016/0030784 | A1 * | 2/2016 | Tsutaki | A62C 3/0292 | 169/61 |
| 2016/0120118 | A1 * | 5/2016 | Bouten | A01M 7/0092 | 222/145.6 |
| 2016/0236021 | A1 * | 8/2016 | Ehlers | A62C 35/02 | |
| 2016/0271434 | A1 * | 9/2016 | Dusing | H04L 67/12 | |
| 2016/0321900 | A1 * | 11/2016 | Rao | B05B 12/12 | |
| 2016/0354626 | A1 * | 12/2016 | McNamara | A62C 35/023 | |
| 2017/0144002 | A1 * | 5/2017 | Ben Neria | A62C 37/44 | |
| 2017/0259097 | A1 * | 9/2017 | Orglmeister | A62C 31/28 | |
| 2017/0319882 | A1 * | 11/2017 | Hart | A62C 31/03 | |
| 2018/0169450 | A1 * | 6/2018 | Moffa | A62C 35/023 | |
| 2019/0099631 | A1 * | 4/2019 | Hart | A62C 31/28 | |
| 2019/0129428 | A1 * | 5/2019 | Chao | A62C 27/00 | |
| 2019/0321668 | A1 * | 10/2019 | Lee | B05B 12/16 | |
| 2020/0077838 | A1 * | 3/2020 | Paller | G01K 13/00 | |
| 2020/0121967 | A1 * | 4/2020 | Gladstone | H04N 7/188 | |
| 2020/0384294 | A1 * | 12/2020 | Zhou | A62C 13/78 | |
| 2021/0134131 | A1 * | 5/2021 | Shin | A62C 99/009 | |
| 2021/0252319 | A1 * | 8/2021 | Bouchard | A62C 31/03 | |

* cited by examiner

KITCHEN FIRE SUPPRESSION AIMING SYSTEMS AND METHODS

CROSS-REFERENCE TO RELATED APPLICATIONS

This application is a continuation of U.S. application Ser. No. 17/253,533, which was filed on Dec. 9, 2019, which claims priority to U.S. Provisional Application No. 62/778,413, which was filed on Dec. 12, 2018 and is incorporated herein by reference.

BACKGROUND

This system relates generally to fire suppression systems and methods, and more particularly to fire suppression systems and methods for kitchen appliances.

Kitchens may include range top appliances with cookware and/or other kitchen appliances for cooking food. Kitchen appliances may create fire hazards, and kitchen fire suppression systems are utilized to suppress these fires.

SUMMARY

A method of suppressing a kitchen fire according to an example of the present disclosure includes detecting a fire and identifying a location of the fire with a tracking system. The method includes aiming a nozzle at the location. The method includes releasing an agent through the nozzle at the location.

In a further example according to any of the foregoing examples, aiming includes moving the nozzle laterally.

In a further example according to any of the foregoing examples, the lateral movement includes moving the nozzle along a track within a hood of a range top.

In a further example according to any of the foregoing examples, the agent is stored in a cylinder, and the nozzle is in fluid communication with the cylinder through a hose.

In a further example according to any of the foregoing examples, the aiming includes rotatably moving the nozzle.

In a further example according to any of the foregoing examples, the aiming includes angular movement of the nozzle.

In a further example according to any of the foregoing examples, aiming includes detecting an object between a target area and the nozzle and moving the nozzle such that the object is not between the target area and the nozzle.

In a further example according to any of the foregoing examples, the tracking system includes at least one optical sensor.

In a further example according to any of the foregoing examples, temperature information is received from a chip in a piece of cookware. The detecting includes determining that the fire exists based on the temperature information.

In a further example according to any of the foregoing examples, the location of the chip is identified with a positioning system.

In a further example according to any of the foregoing examples, the positioning system is a radio frequency identification system.

A fire suppression system for a kitchen according to an example of the present disclosure includes a tracking system that is configured to sense a location of a fire in the kitchen. A nozzle is movable to a select position based on the sensing and is configured to release fire suppression agent onto the fire.

In a further example according to any of the foregoing examples, the nozzle is movable laterally to the select position.

In a further example according to any of the foregoing examples, the lateral movement includes movement along a track within a hood of a range top.

In a further example according to any of the foregoing examples, the nozzle is movable rotatably to the select position.

In a further example according to any of the foregoing examples, the rotatable movement includes rotation of a swivel joint.

In a further example according to any of the foregoing examples, the nozzle is movable angularly to the select position.

In a further example according to any of the foregoing examples, a controller is configured to send control signals to move the nozzle based on the sensing.

In a further example according to any of the foregoing examples, the tracking system includes an infrared sensor for sensing the location of the fire.

In a further example according to any of the foregoing examples, the nozzle is in fluid communication with an agent cylinder through a flexible hose.

These and other features may be best understood from the following specification and drawings, the following of which is a brief description.

DETAILED DESCRIPTION

Figure 1:
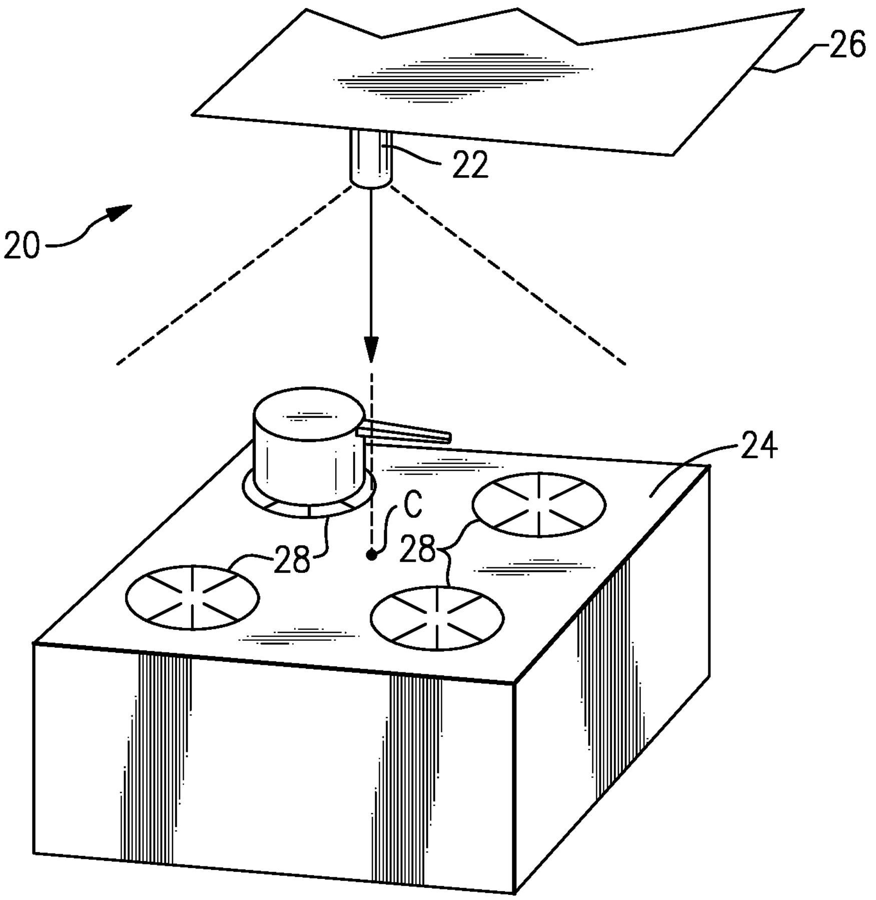
FIG.1 Prior Art
FIG. 1 illustrates a prior art fire suppression system.

FIG. 1 illustrates a prior art fire suppression system 20. A nozzle 22 is configured to release fire extinguishing agent onto an appliance such as range top 24 and maybe located vertically above the range top 24. The nozzle 22 may be adjacent or in a hood 26 used for ventilation of the range top 24 area. The nozzle 22 aim point C is centrally located relative to the range top 24 with a swivel joint (not shown) and has a wide coverage or spray angle to reach the entire range top 24 in the case of a fire, as shown schematically. The nozzle 22 may be manually aimed at the central aim point C upon installation. The range top 24 may include multiple burners 28, each being within the spray coverage of the nozzle 22. The system 20 releases agent onto the entire coverage area to suppress a fire, even if the fire is only located at one of the burners 28, for example. The nozzle 22 may be dedicated to a single range top 24 or other appliance.

Figure 2:
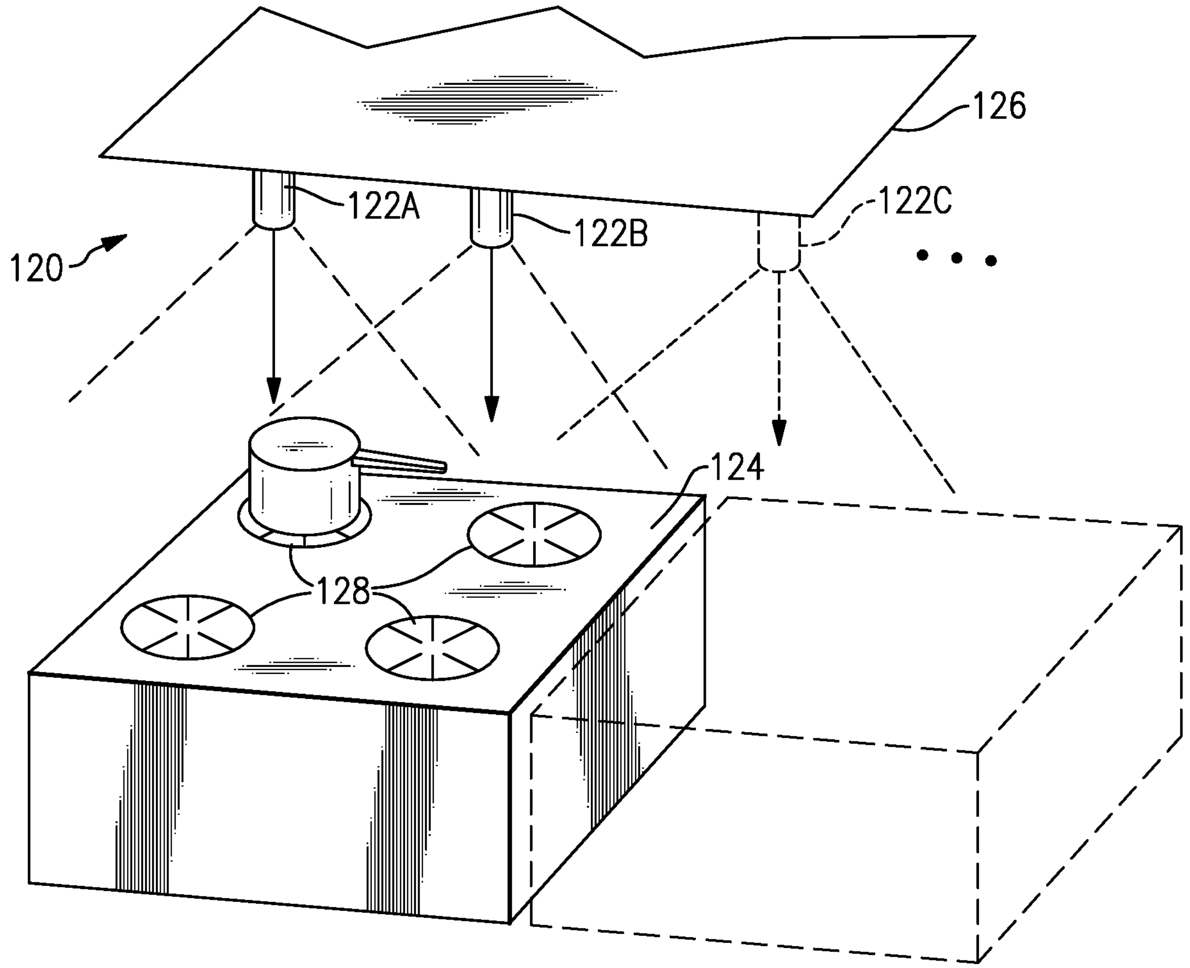
FIG.2 Prior Art
FIG. 2 illustrates a second prior art fire suppression system.

FIG. 2 illustrates a prior art fire suppression system 120 including multiple equally spaced apart nozzles 122A, 122B vertically above a range top 124 and adjacent a hood 126. Like reference numerals identify corresponding or similar elements throughout the several drawings. The combined coverage area of the nozzles 122A, 122B covers the entire range top 124 and any other appliances placed underneath the overlapping coverage "zone," as shown schematically. The spray coverage area of the nozzle 122A overlaps with the spray coverage area of the nozzle 122B to create the zone coverage area. The system 120 releases agent onto the entire zone coverage area to suppress a fire, even if the fire is only located at one of the burners 128, for example. One or more additional nozzles 122C may be utilized, as shown schematically. The system 120 may not have dedicated nozzles 122 to specific range tops 124, and range tops 124 and other appliances may instead be moved about within the zone coverage.

Figure 3:
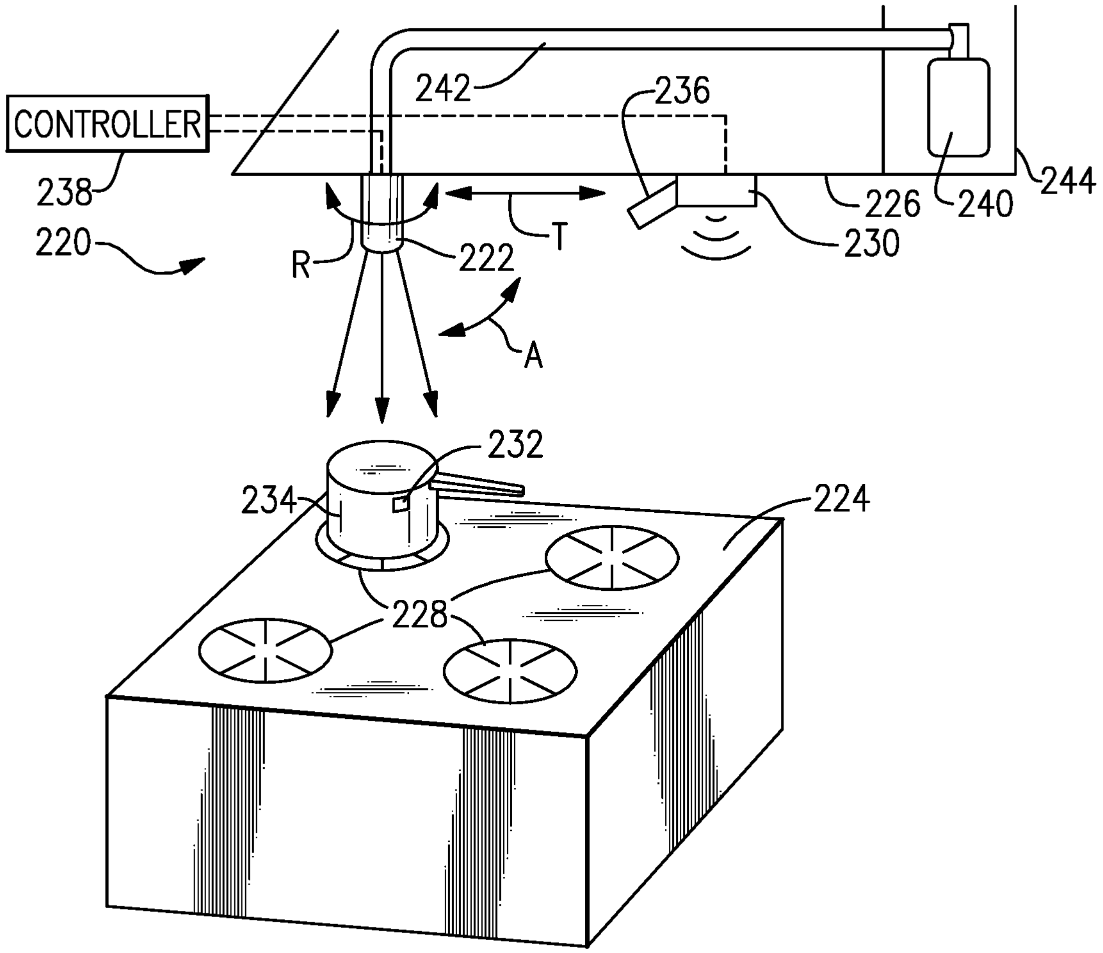
FIG. 3 illustrates a fire suppression system.

FIG. 3 illustrates a fire suppression system 220. A tracking system 230 monitors the appliance, in this example a range top 224, shown schematically. The tracking system 230 may utilize one or more tracking methods, discussed in further detail below, to detect the location of cookware and/or fire on the range top 224. In response to the tracking system 230, the system 220 moves a nozzle 222 to a position to aim at the cookware 234 and/or a fire on the range top 224. As discussed further below, this position may include one or more of a desired coordinate location, rotational position, or angular position. In some examples, the nozzle 222 utilized may be solid stream, full cone, hollow cone, or flat spray.

In some examples, the nozzle 222 may utilize rotational movement R to pivot to a desired position for aiming. Alternatively or additionally, the nozzle 222 may utilize translational movement T to move laterally to aim at a desired position. Alternatively or additionally, the nozzle 222 may utilize angular movement A to angle the nozzle to a desired position. In some examples, the system 220 includes a controller 238 that receives information from the tracking system 230 and sends control signals to actuate the nozzle 222 to move to a desired position, as shown schematically. In some examples, the controller 238 may be programmed with the desired position of the nozzle 222 for each combination of burners 228 being utilized. The tracking system 230 may include one or more sensors 236, such as optical or thermal sensors in some examples.

The controller 238, in some examples, may include one or more computing devices, each having one or more of a computer processor, memory, storage means, network device and input and/or output devices and/or interfaces. The controller 238 is communicatively connected to the tracking system 230 and the nozzle 222, such as through an actuation system (not shown) of the nozzle 222 in some examples. In some examples, the controller 238 is communicatively connected using wired or wireless communications. In some examples, the controller 238 is an analog or electromechanical device configured to provide the disclosed functions of this disclosure. In some examples, the controller may be communicatively connected to the tracking system 230 and/or nozzle 222 through an analog of electromechanical device.

Although a range top 224 is disclosed as an example, other kitchen fire hazard areas, such as fryers, table top burners, open top toasters, griddles, char broilers, and other appliances may benefit from the examples of this disclosure. Although four burners 228 are shown, range tops 224 with more or fewer burners may also benefit from the examples of this disclosure.

In some examples, the tracking system 230 uses object detection to detect the location of a chip 232 embedded in cookware 234 on a burner 228 on a range top 224. The chip 232 may be able to detect and/or indicate temperature information that the system 220 may use to determine whether there is a fire. In some examples, the chip 232 sends signals only when temperatures above a certain threshold are detected. In some examples, the chip 232 sends signals indicative of temperature information continuously, and the controller 238 compares the temperature information to a threshold value to determine whether there is a fire. The tracking system 230 and chip 232 may incorporate active or passive radio frequency identification (RFID), RF-Based Indoor Location Determination, GPS, or other suitable positioning system to identify the location of the chip 232. In one example, the chip 232 may communicate temperature information to the tracking system 230 using a signal, such as radio or Bluetooth, to the tracking system 230 and/or communicate with the tracking system 230 through the internet (IoT), and the tracking system 230 may locate the chip 232 based on Received Signal Strength Indication (RSSI) or other passive tracking system. In one example, the chip 232 may send its location with respect to the nozzle 222, tracking system 230, or geographic coordinate system using a signal, such as radio or Bluetooth, or other active tracking signal to the tracking system 230 and/or communicate through the internet (IoT) using a suitable form of wireless communication. The nozzle 222 may then move to a desired position where it can most easily reach the cookware 234 in case of a fire.

Alternatively or additionally, the tracking system 230 may utilize thermal tracking to detect the location of a fire on the range top or other appliance 224. Thermal tracking may be done with the use of thermal imaging, thermocouples, or infrared sensors, for example. In some examples, the thermal tracking detects which area of an appliance 224 or which appliance 224 has a fire. The nozzle 222 may then be aimed at the fire in response to the fire detection.

The nozzle 222 is in fluid communication with an agent cylinder 240 through conduit 242. In some examples, all or a portion of the conduit 242 is a flexible hose to accommodate the movement of the nozzle 222. The example cylinder 240 may be located in a cabinet 244 to the side of the hood 226, but other locations may also be utilized.

An advantage of the system 220 is that the nozzle 222 may have a more concentrated targeted spray area than prior art systems, thus utilizing less agent for suppressing fires. The nozzle 222 dispensing area may be more concentrated because the nozzle is able to better target a desired location. In some examples, since less agent is utilized, less cylinders 240 may therefore be required, resulting in cost and space savings. Less nozzles may also be required than in some prior art systems. In some examples, one nozzle 222 may cover an entire kitchen or hood since the system 220 will no longer need to discharge onto all of the appliances, only the area on fire. However, although one nozzle 222 and one cylinder 240 are shown in the illustrative example in FIG. 3, more nozzles and/or cylinders may be utilized in some examples. Since less area is sprayed, this can decrease the amount of clean up necessary after discharge causing, in some cases, decrease in down time.

Example systems 220 may include any combination of translational, rotational, and angular movement.

Figure 4:
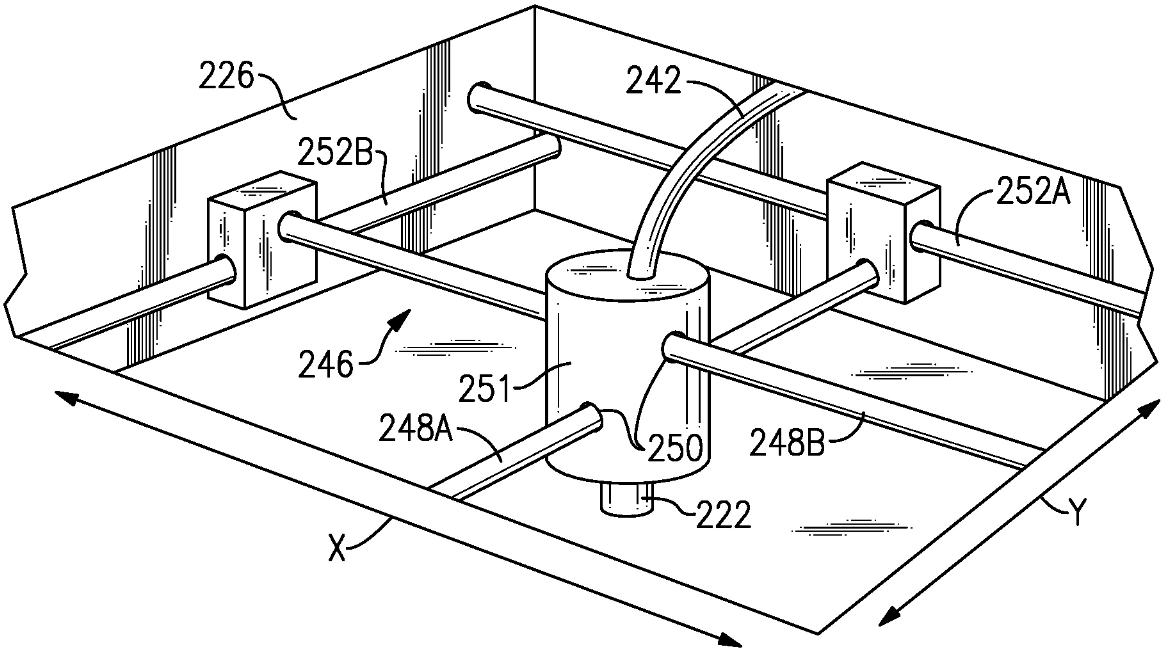
FIG. 4 illustrates an example translational movement system.

FIG. 4 illustrates an example translational movement system 246 for translational movement of the nozzle 222. Tracks 248A and 248B are slidably received within openings 250 of the fixture 251 holding nozzle 222. The nozzle 222 with fixture 251 can move back and forth along the X axis along track 248B and back and forth along the Y axis along track 248A. The track 248A may be slidable along perimeter track 252A fixed to the hood 226, and the track 248B may be slidable along perimeter track 252B fixed to the hood 226. In some examples, the nozzle 222 is movable to a desired X, Y coordinate position for aiming based on detections made by the tracking system 230 and/or instructions from the controller 238 (shown in FIG. 3). A flexible hose 242 is utilized to accommodate movement of the nozzle 222. Although an example translational movement system 246 is shown, other systems for movement in the X, Y and/or Z directions may be utilized.

Figure 5:
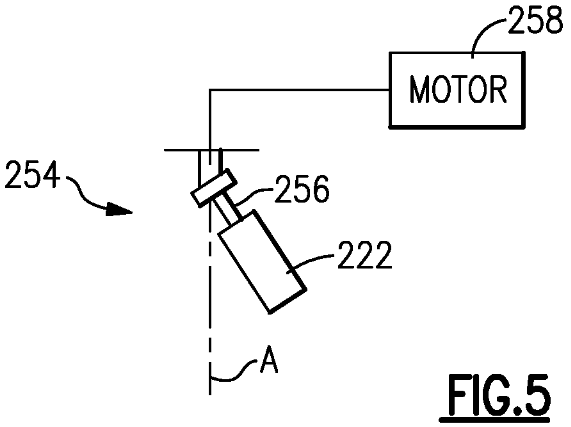
FIG. 5 illustrates an example rotational movement system.

FIG. 5 illustrates an example rotational and angular movement system 254. A swivel joint 256 is pivotally attached to the nozzle 222. The swivel joint 256 may be actuated by a motor 258, such as a servomotor in some examples, to rotate about the axis A to a desired circumferential position for aiming at a desired location. In some examples, angular movement may alternatively or additionally be utilized to vary the angle between the nozzle 222 and the axis A. Although an example rotational and angular movement system 254 is shown, other systems for rotational movement about an axis A may be utilized.

Figure 6:
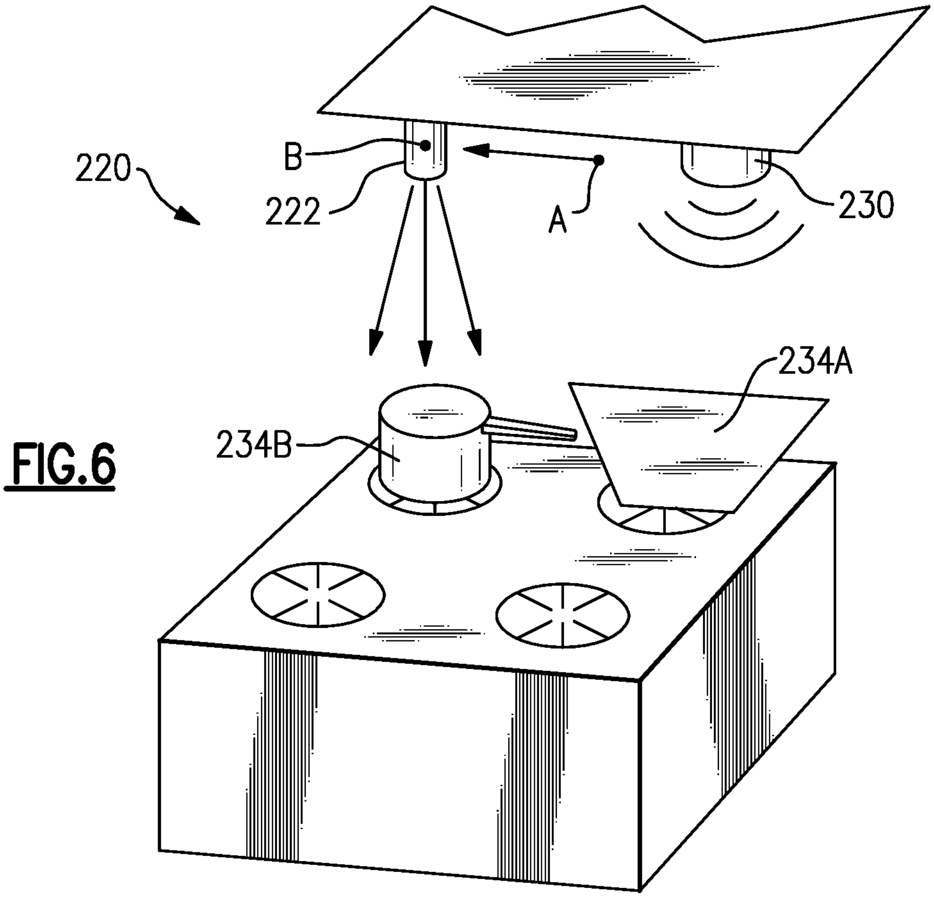
FIG. 6 illustrates an example use of a tracking system of the fire suppression system shown in FIG. 3.

As schematically illustrated in FIG. 6, in some examples, the tracking system 230 may detect the presence of intervening cookware 234A between the nozzle 222 and cookware 234B or another target area. In response, the system 220 may move the nozzle from position A to position B such that the cookware 234A is not between the nozzle 222 and cookware 234B. Although cookware 234A is used in the example shown as an intervening object, the tracking system may be programmed to detect other intervening objects as well, such as other taller cookware, shelves, structures within the hood, and taller appliances that are next to a smaller one.

Figure 7:
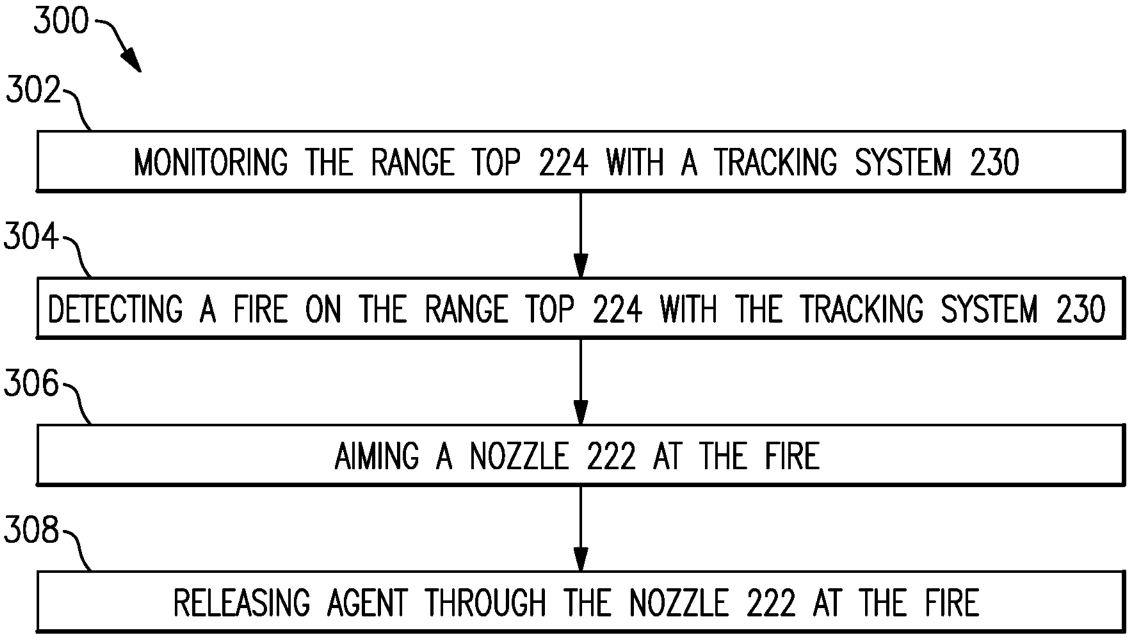
FIG. 7 is a flowchart of an example method of suppressing a fire on a kitchen appliance.

FIG. 7 illustrates a flowchart of a method 300 of suppressing a fire on a range top 224 or other kitchen appliance as illustrated in FIGS. 3 and 6. At 302, the method 300 includes monitoring the range top 224 with a tracking system 230. At 304, the method 300 includes detecting a fire on the range top 224 with the tracking system 230. At 306, the method 300 includes aiming a nozzle 222 at the fire. At 308, the method 300 includes releasing agent through the nozzle 222 at the fire.

The aiming step 306 may include any one or combination of moving the nozzle 222 laterally, rotationally, or angularly, using, for example, one or both of the exemplary movement systems shown and described in FIGS. 4 and 5. In some examples, the method 300 may further include detecting an object between a target area and the nozzle 222, and moving the nozzle 222 such that the object is not between the target area and the nozzle 222. The step of detecting an object between a target area and the nozzle 222 may use tracking system 230.

The systems and methods disclosed can concentrate the required amount of fire suppression agent available towards the fire, efficiently utilizing the agent. There can be less property damage and very little clean up after suppression that may result in less downtime. The systems and methods disclosed will be able to effectively avoid obstacles via tracking.

Although the different embodiments are illustrated as having specific components, the embodiments of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of suppressing a kitchen fire, the method comprising:

detecting a fire and identifying a location of the fire with a tracking system;

aiming a nozzle at the location by moving the nozzle laterally along a track within a hood of an appliance, wherein the track includes an X-axis track portion for movement of the nozzle in an X-axis direction and a Y-axis track portion for movement of the nozzle in a Y-axis direction, such that the nozzle is moveable to a desired X, Y coordinate position within the hood based on the detecting; and releasing agent through the nozzle at the location.

2. The method of claim 1, wherein the agent is stored in a cylinder not movable along the track, and the nozzle is in fluid communication with the cylinder through a hose to allow movement of the nozzle relative to the cylinder.

3. The method of claim 1, wherein the aiming further includes rotatably moving the nozzle about an axis to a desired circumferential position.

4. The method of claim 3, wherein the aiming further includes angularly moving the nozzle to a desired angle between the nozzle and the axis.

5. The method of claim 1, wherein the aiming includes:

detecting an object between a target area and the nozzle; and moving the nozzle such that the object is not between the target area and the nozzle.

6. The method of claim 1, wherein the tracking system includes at least one optical sensor.

7. The method of claim 1, comprising:

receiving temperature information from a chip in a piece of cookware, wherein the detecting includes determining the fire exists based on the temperature information.

8. The method of claim 7, comprising:

identifying a location of the chip with a positioning system.

9. The method of claim 8, where the positioning system is a radio frequency identification system.

10. A fire suppression system for a kitchen, comprising:

a tracking system configured to sense a location of a fire in the kitchen;

an agent cylinder; and a nozzle in fluid communication with the agent cylinder and movable laterally along a track within a hood to a select position based on the sensing and configured to release fire suppression agent onto the fire, wherein the track includes an X-axis track portion for movement of the nozzle in an X-axis direction and a Y-axis track portion for movement of the nozzle in a Y-axis direction, such that the nozzle is moveable to a desired X, Y coordinate position within the hood.

11. The system of claim 10, comprising a swivel joint pivotally attached to the nozzle, wherein the nozzle is further movable rotatably about an axis to a desired circumferential position to the select position, wherein the rotatable movement includes rotation of the swivel joint.

12. The system of claim 10, further comprising a controller configured to send control signals to move the nozzle based on the sensing.

13. The system of claim 10, wherein the tracking system includes an infrared sensor for sensing the location of the fire.

14. The system of claim 10, wherein the nozzle is in fluid communication with the agent cylinder through a flexible hose, and the agent cylinder is not movable along the track, such that the flexible hose allows movement of the nozzle relative to the cylinder.

15. A fire suppression system for a kitchen, comprising:
- a tracking system configured to sense a location of a fire in the kitchen;
- an agent cylinder stored in a fixed position;
- a nozzle in fluid communication with the agent cylinder through a flexible hose to allow for movement of the nozzle relative to the cylinder, the nozzle movable laterally along a track within a hood to a select position based on the sensing and configured to release fire suppression agent onto the fire; wherein the track includes an X-axis portion for movement of the nozzle in an X-axis direction, a Y-axis track portion for movement of the nozzle in a Y-axis direction; and
- a swivel joint pivotally attached to the nozzle, wherein the nozzle is further movable rotatably about an axis to a desired circumferential position to the select position by rotating the swivel joint, and the nozzle is movable angularly to vary an angle between the nozzle and the axis to the select position.

16. The fire suppression system of claim 15, wherein the tracking system is configured to detect an object between a target area and the nozzle and move the nozzle to the select position such that the object is not between the target area and the nozzle.

17. The fire suppression system of claim 15, comprising a fixture holding the nozzle and including a plurality of openings, wherein the track is slidably received within then plurality of openings, and the flexible hose extends from the cylinder to the fixture.

18. The method of claim 1, wherein the nozzle includes a fixture with openings for slideably receiving the X-axis track portion and the Y-axis track portion.

19. The fire suppression system of claim 15, wherein the track includes a first perimeter track portion, a second perimeter track portion, wherein the X-axis track portion is slideable along the first perimeter track portion, and the Y-axis track portion is slideable along the second perimeter track portion, such that the nozzle is moveable to a desired X, Y coordinate position within the hood based on the sensed location, wherein the nozzle includes a fixture with openings for slideably receiving the X-axis track portion and the Y-axis track portion.

20. The fire suppression system of claim 15, where the agent cylinder is stored next to the hood.

* * * * *